United States Patent
Szeppat et al.

(10) Patent No.: US 11,988,278 B2
(45) Date of Patent: May 21, 2024

(54) DUAL CLUTCH TRANSMISSION FOR A MOTOR VEHICLE, IN PARTICULAR FOR AN AUTOMOBILE, METHOD FOR OPERATING A DUAL CLUTCH TRANSMISSION OF THIS TYPE AND MOTOR VEHICLE

(71) Applicant: AUDI AG, Ingolstadt (DE)

(72) Inventors: Enrico Szeppat, Göritzhain (DE); Lutz Gundlach, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 34 days.

(21) Appl. No.: 17/771,922

(22) PCT Filed: May 26, 2020

(86) PCT No.: PCT/EP2020/064487
§ 371 (c)(1),
(2) Date: Apr. 26, 2022

(87) PCT Pub. No.: WO2021/094001
PCT Pub. Date: May 20, 2021

(65) Prior Publication Data
US 2022/0373077 A1    Nov. 24, 2022

(30) Foreign Application Priority Data
Nov. 12, 2019   (DE) .......................... 102019130483.0

(51) Int. Cl.
*F16H 61/00*    (2006.01)
(52) U.S. Cl.
CPC ................................ *F16H 61/0059* (2013.01)
(58) Field of Classification Search
CPC .... F16H 61/0059; F16H 61/688; F16H 61/22; F16H 3/093; F16H 2003/0931;
(Continued)

(56) References Cited

U.S. PATENT DOCUMENTS

| | | | | |
|---|---|---|---|---|
| 2002/0189383 A1* | 12/2002 | Schamscha | ............. | F16H 63/48 74/340 |
| 2014/0130625 A1* | 5/2014 | Dewitz | ............... | G01M 13/025 74/335 |
| 2020/0224761 A1* | 7/2020 | Larsson | ............. | F16H 63/3416 |

FOREIGN PATENT DOCUMENTS

| | | |
|---|---|---|
| DE | 19950696 A1 | 4/2001 |
| DE | 102007000334 A1 | 12/2007 |

(Continued)

OTHER PUBLICATIONS

German Examination Report issued on Nov. 28, 2019, in connection with corresponding German Application No. 102019130483.0 (12 pp., including machine-generated English translation).

(Continued)

*Primary Examiner* — Jacob S. Scott
*Assistant Examiner* — Farhana Pervin
(74) *Attorney, Agent, or Firm* — Maier & Maier, PLLC

(57) ABSTRACT

A dual clutch transmission for a motor vehicle, with a first sub-transmission, with a second sub-transmission, with a first clutch associated with the first sub-transmission, and with a second clutch associated with the second sub-transmission. The dual clutch transmission is designed to be shifted into a parking lock state, in which two gears of one of the sub-transmissions are simultaneously engaged, and in the lock state, the two gears of the one first sub-transmission are simultaneously engaged. A first gear wheel of a first of the gears, which is designed as loose wheel and rotatably arranged on a first shaft of the dual clutch transmission, is connected in a torque-proof manner to the first shaft, by a first switching element.

18 Claims, 1 Drawing Sheet

(58) Field of Classification Search
CPC ......... F16H 2200/0047; F16H 2321/02; F16H 2321/12; F16H 63/3416; F16H 63/3491
See application file for complete search history.

(56) References Cited

FOREIGN PATENT DOCUMENTS

| | | |
|---|---|---|
| DE | 102007019241 A1 | 10/2008 |
| DE | 102010028026 A1 | 10/2011 |
| DE | 102011108013 A1 | 1/2013 |
| DE | 102016105189 A1 | 9/2017 |
| DE | 102016221794 A1 | 5/2018 |
| DE | 102017117079 A1 | 1/2019 |
| WO | 2006128626 A1 | 12/2006 |

OTHER PUBLICATIONS

International Preliminary Report on Patentability with English translation issued on May 17, 2022, in corresponding International Application No. PCT/EP2020/064487; 37 pages.

International Search Report with English translation issued on Sep. 21, 2020, in corresponding International Application No. PCT/EP2020/064487; 4 pages.

* cited by examiner

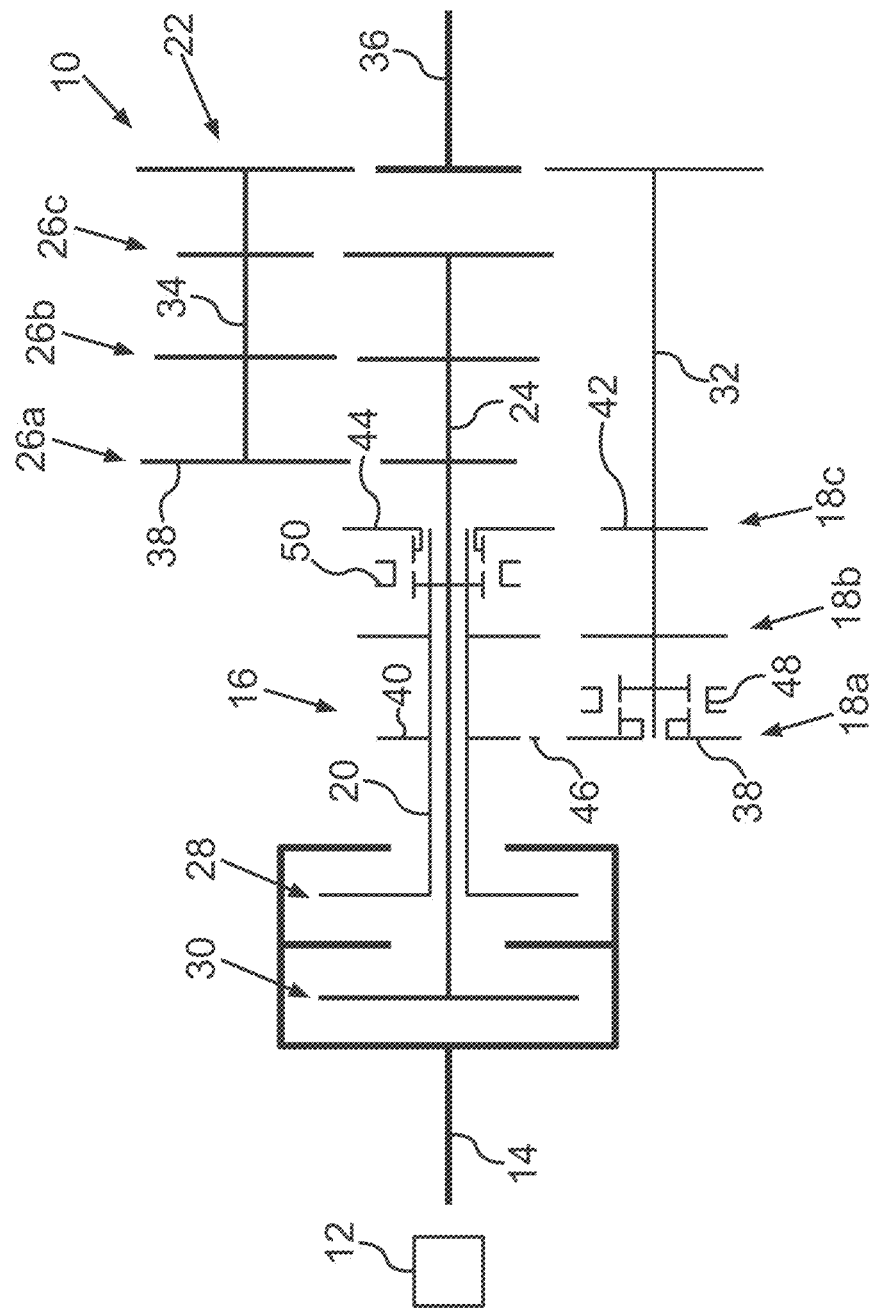

DUAL CLUTCH TRANSMISSION FOR A MOTOR VEHICLE, IN PARTICULAR FOR AN AUTOMOBILE, METHOD FOR OPERATING A DUAL CLUTCH TRANSMISSION OF THIS TYPE AND MOTOR VEHICLE

FIELD

The invention relates to a dual clutch transmission for a motor vehicle. Furthermore, the invention relates to a method for operating such a dual clutch transmission. The invention also relates to a motor vehicle with at least one such a dual clutch transmission.

BACKGROUND

DE 10 2016 221 794 A1 discloses a motor vehicle transmission with a parking lock device, comprising a transmission output shaft, a transmission casing, and a set of gear wheels, which can be connected to the transmission output shaft or is connected thereto in a torque-conducting manner. A hybrid drive train for a vehicle, with at least one internal combustion engine, can be obtained as known from DE 10 2010 028 026 A1.

In addition, from DE 10 2016 105 189 A1, a method for controlling a parking lock with a transmission of an electrically driven vehicle, comprising two gears, is known. Furthermore, DE 199 50 696 A1 discloses a dual clutch transmission for a motor vehicle.

SUMMARY

The problem of the present invention is to provide a dual clutch transmission, a method for operating such a dual clutch transmission, and a motor vehicle with such a dual clutch transmission, in such a manner that a particularly high comfort can be implemented.

A first aspect of the invention relates to a dual clutch transmission for a motor vehicle preferably designed as car, in particular as passenger car. For example, at least one wheel of the motor vehicle can by driven via the dual clutch transmission. In particular, at least or exactly two wheels of the motor vehicle can be driven via the dual clutch transmission, whereby, for example, the motor vehicle as a whole can be driven. This means that the motor vehicle, in its completely produced state, comprises the dual clutch transmission and the wheel or the wheels. The respective wheel is, for example, a ground contact element, via which the motor vehicle is or can be supported in vehicle vertical direction downward on a ground. When the motor vehicle is driven along the ground, while the motor vehicle is supported downward in vehicle vertical direction downward on the ground, the wheel then rolls on the ground. The dual clutch transmission comprises a first sub-transmission and a second sub-transmission. In addition, the dual clutch transmission comprises a first clutch associated with the first sub-transmission and a second clutch associated with the second sub-transmission. For example, the motor vehicle comprises a drive motor by which the motor vehicle can be driven via the dual clutch transmission. Here, the drive motor includes an output shaft designed, for example, as crankshaft. The feature that the first clutch is associated with the first sub-transmission can be understood to mean in particular that the first sub-transmission, in particular a transmission input shaft of the first sub-transmission, can be coupled via the first clutch or by means of the first clutch in a torque-transferring manner to the output shaft, in particular while the second clutch is open. The feature that the second clutch is associated with the second sub-transmission can be understood to mean in particular that the second sub-transmission, in particular a second sub-transmission of the second sub-transmission, can be coupled in a torque-transferring manner to the output shaft via the second clutch or by means of the second clutch, in particular while the first clutch is open. Thus, for example, the motor vehicle can be driven via the dual clutch transmission and in particular via the first sub-transmission of the drive motor, while a driving of the motor vehicle caused by the drive motor via the second sub-transmission stops. Moreover, the motor vehicle can be driven via the dual clutch transmission and in the process via the second sub-transmission by the drive motor, while a driving of the motor vehicle caused by the drive motor via the first sub-transmission stops. The respective clutch is preferably designed as a friction clutch, in particular as a multi-plate clutch, whereby a particularly high comfort, in particular driving comfort, can be implemented.

The dual clutch transmission is to be switched into a parking lock state, in which in particular at least or exactly two gears of one of the sub-transmissions are simultaneously engaged. In other words, the dual clutch transmission designed, for example, as automatic or automated dual clutch transmission, is to designed be switched into a parking lock state in particular after an actuation of an operating element of the motor vehicle caused by a person, in which the two gears of the one sub-transmission are simultaneously engaged. Preferably, it is provided that, in the parking lock state, the clutch associated with the one sub-transmission, the two gears of which are simultaneously engaged, is closed. Moreover, it is preferably provided that, in the parking lock state, the respective other clutch is open. Alternatively or additionally, it is conceivable that, in the parking lock state, only one gear of the other sub-transmission is engaged. Moreover, it is conceivable that, in the parking lock state, all the gears of the other sub-transmission are disengaged. Moreover, it is conceivable that, in the parking lock state, the clutches are simultaneously open or that, in the parking lock state, the clutches are simultaneously closed. Due to the fact that, in the parking lock state, the two gears of the one sub-transmission are simultaneously engaged, the dual clutch transmission can be or is tensioned, for example, by a downhill force acting on the motor vehicle or by an output torque caused by the downhill force, which is introduced, for example, via a transmission pinion shaft or a transmission output shaft of the dual clutch transmission into the dual clutch transmission, in particular the one sub-transmission. The downhill force and the output torque resulting therefrom occur, for example, when the motor vehicle is parked on a hill, that is to say a slope. Here, an undesired rolling away of the motor vehicle can be prevented by the parking lock state.

In order to be able to then implement a particular high comfort, in particular driving comfort, of the motor vehicle, it is provided according to the invention that, in the parking lock state, the two gears of the one sub-transmission are simultaneously engaged, in that a first gear wheel of a first of the gears, which first gear wheel is designed as loose wheel and rotatably arranged on a first shaft of the dual clutch transmission, in particular of the one sub-transmission, is connected in a torque-proof manner to the first shaft, by means of a first switching element, associated with the first gear, arranged on the first shaft, and connected in a torque-proof manner to the first shaft, while a second gear wheel of the second gear, which second gear wheel is designed as loose wheel and rotatably arranged on a second shaft of the dual clutch transmission, in particular of the one sub-transmission, is connected in a torque-proof manner to the second shaft by means of a second switching element, associated with the second gear, arranged on the second shaft, and connected in a torque-proof manner to the second shaft. The shafts are preferably designed separate from one another. In particular, the shafts can in principle rotate relative to one another, in particular if the shafts are not locked against rotations occurring relative to one another. The feature that the respective gear wheel is designed as a loose wheel should be understood to mean in particular that the gear wheel or the loose wheel itself or individually is rotatably arranged on the respective shaft. The first switching element can here be switched between at least one connection state and least one release state, in particular relative to the first shaft and/or moved by translation between the first connection and the first release state. In the first connection state the first gear wheel is connected in a torque-proof manner to the first gear wheel by means of the first switching element. However, in the first release state the first gear wheel can be rotated relative to the first shaft or in the first release state the first switching element releases the first gear wheel for a rotation occurring relative to the first shaft.

The second switching element can be switched, for example, between at least one second connection state and at least one second release state. In particular, for example, the second switching element can be moved in particular relative to the second shaft and/or by translation between the second connection state and the second release state. In the second connection state, the second gear wheel is connected in a torque-proof manner to the second shaft, by means of the second switching element. However, in the second release state, the second gear wheel can be rotated relative to the second shaft. In other words, in the second release state, the second switching element releases the second gear wheel for a rotation occurring relative to the second shaft. The gear wheels and the switching elements are, for example, part of a set of wheels, the arrangement or design of which is selected according to the invention so that the first switching element associated with the first gear does not lie on the same shaft as the second switching element associated with the second gear. Since the aforementioned gears are used to implement the parking lock state and thereby tension and thus lock the dual clutch transmission, the gears are also referred to as lock gears. Since, in addition, the one sub-transmission is used to implement the parking lock state, the one sub-transmission is also referred as locked sub-transmission. Since, in the parking lock state, all the gears of the other sub-transmission are preferably disengaged, the other sub-transmission is also referred to, for example, as non-locked sub-transmission. Due to the fact that, in the parking lock state, the one sub-transmission is tensioned or locked, in order to thereby prevent an undesired rolling away of the motor vehicle, in the parking lock state, a parking lock of the dual clutch transmission is activated. Here, for the implementation of the parking lock, the gear wheels and the switching elements, which are used in any case, are used, so that a separate and mechanical parking lock device, additionally provided for this purpose, can be avoided.

The invention here enables in particular a release of the parking lock, that is to say an ending or deactivating the parking lock state, by means of any of the clutches also referred to as driving clutches and in particular independently of a downhill slope and thus independently of whether, for example, the downhill force acts on the motor vehicle in vehicle longitudinal direction from the rear to the front or else from the front to the rear. Due to the above described arrangement of the set of wheels, when ending or for ending the parking lock state, a non-positive connection in a driving direction desired by the driver can always be immediately ensured, that is to say independently of whether the driver wishes to start the motor vehicle forward in vehicle longitudinal direction or else in reverse in vehicle longitudinal direction. In other words, the parking lock state is activated in particular during a standstill of the motor vehicle. For example, in order to be able to start the motor vehicle after the standstill, the parking lock state is ended. Here, it is in principle conceivable that the driver of the motor vehicle wishes to start the motor vehicle forward in vehicle longitudinal direction or else in reverse in vehicle longitudinal direction. By means of the invention, this can then be implemented with particularly little delay or with no delay. In other words, the parking lock state can be ended particularly quickly by means of the invention, so that that driver can start the motor vehicle with particularly little delay, in particular with no delay. At the same time, the parking lock state can be ended at least almost without jolting or at least with little jolting. This means that the parking lock state can be ended without excessive movements and/or noises of the motor vehicle, which can be perceived by occupants of the motor vehicle.

The invention is based in particular on the following findings: if the motor vehicle is parked, for example, on a slope, and if the parking lock is then engaged or activated, the dual clutch transmission, consisting in particular of a sub-transmission, is tensioned by the downslope force resulting from the weight of the vehicle and here in particular by the downhill torque resulting from the downhill force.

For example, in order to prevent excessively strong jolting, also referred to as release jolting, when the parking lock is deactivated, for example, a torque introduction can occur via one of the clutches. This means that, for example, a torque provided by a drive element of the motor vehicle is introduced via one of the clutches into the one sub-transmission. This torque counteracts, for example, the downhill force or the downhill torque. As the one clutch, for example, the clutch associated with the one sub-transmission is used, or else, as the one clutch, for example, the clutch associated with the other, non-locked sub-transmission is used. Then, for example, the torque is introduced in such a manner into the one, locked sub-transmission that at least or exactly one gear of the other, non-locked sub-transmission is engaged. Thus, the torque is then introduced via the clutch associated with the other, non-locked sub-transmission and via the engaged gear of the other, non-locked sub-transmission into the one, locked sub-transmission. The torque can counteract the downhill torque also referred to as tensions, in particular in such a manner that the downhill torque or the tensioning of the one sub-transmission, caused by the downhill torque, is at least reduced or eliminated. Subsequently, the parking lock can be deactivated, that is to say the parking lock state can be ended, without excessive jolting occurring. The parking lock is disengaged in such a manner, that is to say the parking lock state is ended, for example in such a manner that, in particular after the introduction of the torque into the one sub-transmission has been started, and preferably while the torque is being introduced into the one sub-transmission, at least one of the lock gears is disengaged or else both lock gears are disengaged. By introducing the torque, the parking lock state can be ended with particularly little noise, in particular without noise.

An additional finding underlying the invention here is that the previously described torque introduction via the one clutch into the one sub-transmission must occur in such a manner that the torque acts in a direction of rotation, which leads or can lead to a movement of the motor vehicle running in vehicle longitudinal direction, which is opposite to the movement of the motor vehicle, desired, for example, by the driver when starting, potentially leading to a clear temporal delay, before such a non-positive connection can be established, which leads to the movement desired by the driver. Such an excessive temporal delay can then be avoided by the invention, so that a particularly high comfort, in particular driving comfort, can be implemented. In other words, in the invention, a non-positive connection in the driving direction desired by the driver can always be ensured. In other words, independently of whether the driver wishes to start the motor vehicle in vehicle longitudinal direction forward or else in vehicle longitudinal direction in reverse, in particular with little delay, in particular without delay, a corresponding non-positive connection in the dual clutch transmission can be engaged, so that the parking lock state can be ended particularly quickly and the vehicle can be driven or started with little delay in the driving direction desired by the driver.

In order to be able to implement a particularly high comfort, it is provided, in an additional embodiment of the invention, that the one sub-transmission comprises a reverse gear. A reverse gear is designed to cause driving in reverse or engaged to cause driving in reverse.

An additional embodiment is characterized in that one of the lock gears is the reverse gear. Subsequently, the parking lock state can be ended particularly quickly, independently of the direction of action of the downhill force and independently of the driving direction desired by the driver, so that the motor vehicle can be started at least almost without delay.

Here, it has been shown to be particularly advantageous if one of the gears is a forward gear. The forward gear is designed to cause forward driving of the motor vehicle or engaged to cause forward driving. Due to the fact that one of the lock gears is the forward gear, the parking lock state can be ended particularly quickly, and the motor vehicle can be started with particularly little delay.

This means that it has been shown to be particularly advantageous if, in the parking lock state, in which the lock gears are simultaneously engaged, one of the lock gears is the reverse gear, and the other lock gear is the forward gear. Thereby, it is possible that at least one of the lock gears can be disengaged with a particularly low actuation force, so that the parking locking state can be ended particularly simply and comfortably, in particular without excessive jolting. Preferably, the forward gear and the reverse gear, or the lock gears, are gears of the same sub-transmission. In particular, the following was found: for example, if the motor vehicle is parked on a slope, while the dual clutch transmission is in the parking lock state, so that a downhill force acts on the motor vehicle, then a torque resulting from the downhill force is introduced into the dual clutch transmission. If then one of the lock gears is the forward gear and the other lock gear is the reverse gear, a particularly advantageous gear ratio between the lock gears can be brought about, such that the torque can be distributed particularly advantageously over the lock gears, in particular in such a manner that at least one of the lock gears can be designed particularly simply, in order to end the parking lock state.

In order to implement a particularly high comfort, the respective switching element is a positive-locking switching element, in particular a claw clutch.

An additional embodiment is characterized in that, in the parking lock state, both clutches are simultaneously closed. Thereby, the parking lock state can be ended particularly quickly, and the motor vehicle can be started with particularly little delay.

A second aspect of the invention relates to a method for operating a dual clutch transmission, in particular according to the first aspect of the invention. The dual clutch transmission includes a first sub-transmission, a second sub-transmission, a first clutch associated with the first sub-transmission, and a second clutch associated with the second sub-transmission. During the method, the dual clutch transmission is in a parking lock state in which both gears of one of the sub-transmissions are simultaneously engaged.

In order to be able to implement in the process a particularly high comfort, in particular driving comfort, it is provided according to the invention that, in the parking lock state, the two gears of the one sub-transmission are simultaneously engaged, in that a first gear wheel of a first of the gears, which first gear wheel is designed as a loose wheel and rotatably arranged on a first shaft of the one sub-transmission, is connected in a torque-proof manner to the first shaft by means of a first switching element which is associated with the first gear, arranged on the first shaft and connected in a torque-proof manner to the first shaft, while a second gear wheel of the second gear, which second gear wheel is designed as loose wheel and rotatably arranged on a second shaft of the one sub-transmission, is connected in a torque-proof manner to the second shaft by means of a second switching element which is associated with the second gear, arranged on the second shaft, and connected in a torque-proof manner to the second shaft. Advantages and advantageous embodiments of the first aspect of the invention are to be considered advantages and advantageous embodiments of the second aspect of the invention and vice versa.

In order to be able to end the parking lock state with particularly little noise and jolting and thus particularly comfortably, it is provided in an embodiment of the invention that, to end the parking lock state, a first step also designated a and a second step designated b are also carried out. In the first step, a torque caused or provided by a drive element of the motor vehicle is introduced via one of the clutches, that is to say via the clutch associated with the one sub-transmission or via the clutch associated with the other sub-transmission into the one sub-transmission, while the gears of the one sub-transmission are engaged and, preferably, the clutch associated with the one sub-transmissions and/or the clutch engaged with the other sub-transmission is/are closed. In the second step of the method, at least one of the lock gears engaged in the first step is disengaged. Preferably, the second step is carried out after the introduction of the torque into the one sub-transmission has been started and in particular while the torque is still being introduced into the one sub-transmission. Preferably, the torque counteracts the aforementioned downhill torque. By the introduction of the torque, the previously described tensioning of the dual clutch transmission can be at least reduced or eliminated, so that the at least one gear can then be disengaged, without excessive jolting occurring, which can be perceived, for example, by occupants of the motor vehicle. The method thus makes it possible to end the parking lock state, that is to say to disengage or deactivate the parking lock, without excessive jolting occurring, which can be perceived by occupants of the motor vehicle.

Here, it has been shown to be particularly advantageous if, in the second step, the at least one gear is disengaged, while the other gear, which is engaged in the first step, remains engaged. Thereby, the motor vehicle can be started with particularly little delay, so that a particularly high comfort can be provided.

Finally, a third aspect of the invention relates to a motor vehicle, preferably designed as car, in particular as passenger car, which comprises a dual clutch transmission according to the invention according to the first aspect of the invention. Advantages and advantageous embodiments of the first and second aspects of the invention are to be considered advantages and advantageous embodiments of the third aspect of the invention and vice versa.

Variants of the method according to the invention and of the motor vehicle according to the invention, which comprise features as already described in connection with the variants of the dual clutch transmission according to the invention, are also part of the invention. For this reason, the corresponding variants of the method according to the invention and of the motor vehicle according to the invention are not described again here. The motor vehicle according to the invention is preferably designed as car, in particular as passenger car or truck, or as passenger bus or motor bike. The invention also includes the combinations of the features of the described embodiments.

BRIEF DESCRIPTION OF THE FIGURE

Below, an embodiment example of the invention is described. For this purpose, the single FIGURE shows a diagrammatic representation of a dual clutch transmission of a motor vehicle according to the invention.

The embodiment examples explained below are preferred embodiments of the invention. In the embodiment examples, the described components of the embodiments each represent individual features of the invention, which are to be considered independently of one another and which also each develop the invention independently of one another. Therefore, the disclosure should also include other combinations than the represented combinations of the features of the embodiment. Moreover, the described embodiment can also be supplemented by other already described features of the invention.

DETAILED DESCRIPTION

The single FIGURE shows in a diagrammatic representation a dual clutch transmission 10 of a motor vehicle which is preferably designed as car or preferably as passenger car. The motor vehicle comprises at least one drive motor, by means of which at least two wheels of the motor vehicle can be driven via the dual clutch transmission 10. By driving the wheels, the motor vehicle as a whole can be or is driven. The wheels are ground contact elements, via which the motor vehicle can be or is supported on a ground in vehicle vertical direction downward. The wheels are also referred to as vehicle wheels and they roll on the ground when the motor vehicle is driven along the ground, while it is supported on a ground in vehicle vertical direction downward. The drive motor is represented particularly diagrammatically in the FIGURE and designated 12 therein. The drive motor 12 can be an internal combustion engine which is designed, for example, as a reciprocating internal combustion engine, or else an electric machine. The drive motor 12 comprises an output shaft 14 designed, for example, as crankshaft.

The dual clutch transmission 10 comprises a first sub-transmission 16 which includes, for example, three first gears 18*a-c*. In addition, the first sub-transmission 16 comprises a first transmission input shaft 20 which in the present case is designed as a hollow shaft. The dual clutch transmission 10, in addition, includes a second sub-transmission 22 which comprises a second transmission input shaft 24 and second gears 26*a-c*. The gears 18*a-c* are, for example, odd-numbered gears or they also referred to as odd-numbered gears, wherein, for example, the gear 18*a* can be the so-called first gear, the gear 18*b* can be the so-called third gear, and the gear 18*c* can be the so-called fifth gear of the dual clutch transmission 10. However, in the embodiment example illustrated in the FIGURE, the gear 18*a* is a reverse gear for causing a reverse travel of the motor vehicle. In contrast, the gears 18*b* and 18*c* are forward gears for causing a respective forward travel of the motor vehicle.

The gears 26*a-c*, for example, are also referred to as even-numbered gears or they are so-called even-numbered gears of the dual clutch transmission 10, wherein, for example, the gear 26*a* can be the second gear, the gear 26*b* can be the fourth gear, and the gear 26*c* can be the sixth gear of the dual clutch transmission 10. The gears 26*a-c* are forward gears for causing a forward travel of the motor vehicle.

The dual clutch transmission 10 comprises a first clutch 28 which is associated with the sub-transmission 16 and which, for example with respect to the sub-transmissions 16 and 22, in particular with respect to the transmission input shafts 20 and 24, is associated exclusively with the sub-transmission 16 or exclusively with the transmission input shaft 20 but not with the sub-transmission 22 and not with the transmission input shaft 24. The dual clutch transmission 10, in addition, includes a second clutch 30 which is associated with the sub-transmission 22 and which, for example with respect to the sub-transmissions 16 and 22, in particular with respect to the transmission input shafts 20 and 24, is associated exclusively with the sub-transmission 22 or exclusively with the transmission input shaft 24 but not with the sub-transmission 16 or, however, not with the transmission input shaft 20. This means that, by means of the clutch 28, with respect to the transmission input shafts 20 and 24, exclusively the transmission input shaft 20 can be connected in a torque-transferring manner to the output shaft 14. By means of the clutch 30, with respect to the transmission input shafts 20 and 24, exclusively the transmission input shaft 24 can be connected or coupled in a torque-transferring manner to the output shaft 14. In addition, the transmission input shaft 20 is designed as a hollow shaft which in the present case is passed through at least partially, in particular at least mostly, or completely, by the transmission input shaft 24 designed as solid shaft.

The respective sub-transmission 16 to 22 also comprises a side shaft 32 or 34 also referred to as auxiliary shaft. The dual clutch transmission 10, in addition, comprises a transmission output shaft 36 which is common to the sub-transmissions 16 and 20, in particular the side shafts 32 and 34 and which can be driven by the side shafts 32 and 34 and is also referred to as transmission output shaft.

Via its output shaft 14, the drive motor 12 can provide at least one drive torque which can be introduced via the respective clutch 28 or 30 into the respective sub-transmission 16 or 22 and over it to the transmission output shaft 36. In this way, via the dual clutch transmission 10, the aforementioned wheels can be driven by the drive motor 12.

Preferably, it is provided that the clutch 30, when the clutch 28 is closed, in addition, it is preferably provided that the clutch 28, when the clutch 30 is closed, is open. Thus, preferably at all times only one of the sub-transmissions 16 and 22 is connected via the respective clutch 28 or 30 in a torque-transferring manner to the output shaft 14.

The dual clutch transmission 10 is designed to be switched into a parking lock state, in particular after an acquisition of an actuation of an operating element of the motor vehicle caused by a person. In other words, during a method of operating the dual clutch transmission 10, it can be provided that the dual clutch transmission 10 is switched during the method into a parking lock state. In the parking lock state, for example, the gears 18a and 18c of the sub-transmission 16 are simultaneously engaged, in particular while the gears or all the gears 26a-c of the respective other sub-transmission 22 are disengaged. In addition, it is preferably provided that, in the parking lock state, one of the clutches 28 and 30 is closed, while the respective other clutch 30 or 28 is open, or, in the parking lock state, both clutches 28 and 30 are simultaneously open, or, in the parking lock state, both clutches 28 and 30 are simultaneously closed. In the parking lock state, a mechanical parking lock is activated, since the sub-transmission 16, also referred to as closed sub-transmission, can be or is tensioned. Thereby, in particular if the motor vehicle is parked on a hill or on a slope, an undesired rolling away is prevented, since, due to the tensioning of the sub-transmission 16, the wheels are secured against rotation. In particular, if the motor vehicle is parked on the slope or on a slope, a downhill force resulting from the weight of the motor vehicle acts on the motor vehicle. A downhill torque results from this downhill force, and, for example, in the parking lock state, said downhill torque is introduced via the wheels and the transmission output shaft 36 into the dual clutch transmission 10, in particular into the sub-transmission 16 and thus acts on the dual clutch transmission 10, in particular on the sub-transmission 16. Thus, the downhill torque acts as a tensioning torque by which the sub-transmission 16 is tensioned. Thereby, the aforementioned mechanical parking lock is implemented and activated.

Using the gears 18a and 18c, it can be detected that, for example, the gear 18a comprises two gear wheels 38 and 40, wherein the gear wheel 40 is arranged on the transmission input shaft 20 and the gear wheel 38 is arranged on the side shaft 32. The gear 18c includes two mutually meshing gear wheels 42 and 44, wherein the gear wheel 44 is arranged on the transmission input shaft 20, and the gear wheel 42 is arranged on the side shaft 32. The transmission input shaft 20 and the side shaft 32 are shafts of the dual clutch transmission 10, in particular of the sub-transmission 16, wherein the shafts are designed separate from one another and can be rotated relative to one another. In particular, the shafts are arranged offset with respect to one another, wherein the shafts extend at least substantially parallel to one another.

In order to be able to then implement a particularly high comfort, in particular driving comfort, of the motor vehicle, the gear wheel 38 arranged on the side shaft 32 is designed as a loose wheel which is rotatably arranged on the side shaft 32. In addition, the gear wheel 44 arranged on the transmission input shaft 20 is designed as a loose wheel which is rotatably arranged on the transmission input shaft 20. Moreover, the gear 18a is designed as the aforementioned reverse gear. Here, the gear wheel 38 does not mesh with the gear wheel 40, instead an intermediate gear wheel 46 associated with the gear wheels 38 and 40 is provided for the reversal of the direction of rotation. Here, the intermediate gear wheel 46 simultaneously meshes with the gear wheels 38 and 40.

In the present case a switching element 48, designed as shift collar or claw clutch and thus as positive-locking switching element, is associated with the gear wheel 38, designed as loose wheel, wherein said switching element is connected in a torque-proof manner to the side shaft 32 and can be switched between a first connection state shown in the FIGURE and a first release state, in particular moved by translation relative to the side shaft 32. In the first release state, the switching element 48 releases the gear wheel 38 for a rotation occurring relative to the side shaft 32. However, in the first connection state, the gear wheel 38 is connected by means of the switching element 48 in a torque-proof manner to the side shaft 32, in particular by positive connection.

The gear wheel 44 also is designed as a loose wheel which is rotatably arranged on the transmission input shaft 20. The gear wheel 44 directly meshes with the gear wheel 42. In addition, a second switching element 50, designed as shift collar or claw clutch and thus designed as positive-locking switching element, is associated with the gear wheel 44, wherein said second switching element can be switched between at least one second connection state shown in the FIGURE and a second release state, in particular moved by translation relative to the transmission input shaft 20. In the second release state, the switching element 50 releases the gear wheel 44 for a rotation occurring relative to the transmission input shaft 20. However, in the second connection state, the gear wheel 44 is connected in a torque-proof manner to the transmission input shaft 20 by means of the switching element 50. The feature that the gears 18a and 18c are simultaneously engaged in the parking lock state is to be understood to mean in particular that, in the parking lock state, the switching elements 48 and 50 are simultaneously in their connection states, so that the gear wheels 38 and 44 are simultaneously connected in a torque-proof manner to the side shaft 32 or to the transmission input shaft 20. In the case of the dual clutch transmission 10, a particularly quick ending of the parking lock state, that is to say a particularly quick disengagement or deactivation of the parking lock, is possible, in particular independently of whether the downhill force acts in vehicle longitudinal direction from the front to the rear or else from the rear to the front, independently of whether the driver, when starting the motor vehicle which initially is at standstill, wishes to start the motor vehicle in vehicle longitudinal direction forward or in reverse. A non-positive connection required for the starting can always be immediately implemented in such a manner that the driver can start the motor vehicle in the travel direction which they desire without an excessive delay occurring and without excessive load jolting occurring during the deactivation of the parking lock.

The invention claimed is:

1. A dual clutch transmission for a motor vehicle, comprising:
   a first sub-transmission associated with a first clutch;
   a second sub-transmission associated with a second clutch, wherein the dual clutch transmission is configured to be shifted into a parking lock state, in which two gears of the first sub-transmission are simultaneously engaged,
   a first gear wheel, configured as a loose wheel and rotatably arranged on a first shaft of the dual clutch transmission;

a first switching element, configured to connect the first gear wheel in a torque-proof manner to the first shaft;

a second gear wheel configured as a loose wheel and rotatably arranged on a second shaft of the dual clutch transmission; and a second switching element configured to connect the second gear wheel in a torque-proof manner to the second shaft and to end the parking lock state by introducing a torque to a locked sub-transmission so that exactly one gear of the non-locked sub-transmission is engaged and then introducing the torque via a clutch associated with the non-locked sub-transmission to the locked sub-transmission.

2. The dual clutch transmission according to claim 1, wherein the first sub-transmission comprises a reverse gear.

3. The dual clutch transmission according to claim 2, wherein one of the gears is a forward gear.

4. The dual clutch transmission according to claim 2, wherein the respective switching element is a claw clutch.

5. The dual clutch transmission according to claim 2, wherein, in the parking lock state, both clutches are simultaneously closed.

6. The dual clutch transmission according to claim 2, wherein one of the gears is the reverse gear.

7. The dual clutch transmission according to claim 6, wherein one of the gears is a forward gear.

8. The dual clutch transmission according to claim 6, wherein the respective switching element is a claw clutch.

9. The dual clutch transmission according to claim 6, wherein, in the parking lock state, both clutches are simultaneously closed.

10. The dual clutch transmission according to claim 1, wherein one of the gears is a forward gear.

11. The dual clutch transmission according to claim 10, wherein the respective switching element is a claw clutch.

12. The dual clutch transmission according to claim 10, wherein, in the parking lock state, both clutches are simultaneously closed.

13. The dual clutch transmission according to claim 1, wherein the respective switching element is a claw clutch.

14. The dual clutch transmission according to claim 13, wherein, in the parking lock state, both clutches are simultaneously closed.

15. The dual clutch transmission according to claim 1, wherein in the parking lock state, both clutches are simultaneously closed.

16. A method for operating a dual clutch transmission of a motor vehicle, comprising:

switching the dual clutch transmission into a parking lock state, in which two gears of the first sub-transmission are simultaneously engaged, a first gear wheel, configured as a loose wheel and rotatably arranged on a first shaft of the dual clutch transmission, is connected in a torque-proof manner to the first shaft by a first switching element, associated with the first gear, arranged on the first shaft, and connected in a torque-proof manner to the first shaft, a second gear wheel, configured as a loose wheel and rotatably arranged on a second shaft of the dual clutch transmission, is connected in a torque-proof manner to the second shaft by a second switching element, associated with the second gear; and ending the parking lock state by introducing a torque, wherein the torque is introduced to a locked sub-transmission so that exactly one gear of the non-locked sub-transmission is engaged and then introducing the torque via a clutch associated with the non-locked sub-transmission to the locked sub-transmission.

17. The method according to claim 16, wherein while one gear is disengaged, the other gear remains engaged.

18. A motor vehicle, with a dual clutch transmission comprising:

a first sub-transmission associated with a first clutch; and a second sub-transmission, associated with a second clutch, wherein the dual clutch transmission is configured to be shifted into a parking lock state, in which two gears of the first sub-transmission are simultaneously engaged, a first gear wheel configured as a loose wheel and rotatably arranged on a first shaft of the dual clutch transmission;

a first switching element, configured to connect the first gear wheel in a torque-proof manner to the first shaft;

a second gear wheel configured as a loose wheel and rotatably arranged on a second shaft of the dual clutch transmission;

a second switching element configured to connect the second gear wheel in a torque-proof manner to the second shaft and end the parking lock state by introducing a torque to a locked sub-transmission so that exactly one gear of the non-locked sub-transmission is engaged and then introducing the torque via a clutch associated with the non-locked sub-transmission to the locked sub-transmission.

\* \* \* \* \*